US005697990A

United States Patent [19]

Shakley et al.

[11] Patent Number: 5,697,990

[45] Date of Patent: *Dec. 16, 1997

[54] HIGH POROSITY CALCIUM SILICATE MASS FOR STORING ACETYLENE GAS

[75] Inventors: Gregory T. Shakley, Mobile, Ala.; Richard A. Kot, Dublin, Ohio; Michael S. Rabren, Citronelle, Ala.; Asok K. Sarkar, Kettering, Ohio

[73] Assignee: Worthington Acetylene Cylinder, Inc., Citronelle, Ala.

[ * ] Notice: The term of this patent shall not extend beyond the expiration date of Pat. No. 5,632,788.

[21] Appl. No.: 570,092

[22] Filed: Dec. 11, 1995

Related U.S. Application Data

[63] Continuation-in-part of Ser. No. 381,356, Jan. 31, 1995, Pat. No. 5,632,788.

[51] Int. Cl.[6] .......... B01J 20/10

[52] U.S. Cl. .......... 48/174; 48/199; 141/4; 206/7; 206/704; 220/88.1

[58] Field of Search .......... 206/7, 704; 220/88.1; 502/407, 413; 141/4; 48/174, 179

[56] References Cited

U.S. PATENT DOCUMENTS

| | | | |
|---|---|---|---|
| 2,883,040 | 4/1959 | Pater et al. | 206/7 |
| 3,794,505 | 2/1974 | Helser et al. | 106/119 |
| 3,816,149 | 6/1974 | Zettel | 106/120 |
| 3,895,096 | 7/1975 | Helser et al. | 423/331 |
| 3,902,913 | 9/1975 | Helser et al. | 106/120 |
| 3,909,345 | 9/1975 | Parker et al. | 162/72 |
| 3,926,652 | 12/1975 | Sisco, Jr. et al. | 106/118 |
| 4,129,450 | 12/1978 | Flanigen et al. | 106/120 |
| 4,238,240 | 12/1980 | Krijgsman | 106/120 |
| 4,349,463 | 9/1982 | Flanigen | 252/457 |
| 4,402,892 | 9/1983 | Helser | 264/42 |
| 4,451,332 | 5/1984 | Annergren et al. | 162/30.1 |
| 4,467,040 | 8/1984 | Bruni et al. | 501/80 |
| 4,467,041 | 8/1984 | Bruni et al. | 501/80 |
| 4,721,698 | 1/1988 | Bruni et al. | 502/407 |
| 4,765,458 | 8/1988 | Flanigen | 206/7 |
| 4,800,930 | 1/1989 | Rabren | 141/9 |
| 4,895,825 | 1/1990 | Deck et al. | 502/407 |
| 5,035,774 | 7/1991 | Rabren | 202/164 |

*Primary Examiner*—Nina Bhat

*Attorney, Agent, or Firm*—Fay Sharpe Beall Fagan Minnich & McKee

[57] ABSTRACT

A hardened asbestos-free, porous, calcium silicate filler material for an acetylene storage vessel is made by mixing quicklime with water to form a first mixture. Then ground quartz silica is added to form a second mixture. A fibrous reinforcing material is blended in to form a third mixture. A precipitated silica (or synthetic silica) is added and homogenized to form a fourth mixture. The fourth mixture is transferred into a cylinder to be filled and is cured under saturated steam pressure. Thereafter, the cylinder is dried. A gas storage cylinder so formed has a monolithic dry mass filling a metal shell. The mass has a porosity of about 88 to 92%, a density in the range of 250 g/l to 350 g/l, and a crush strength of 250 to 550 psig.

21 Claims, 1 Drawing Sheet

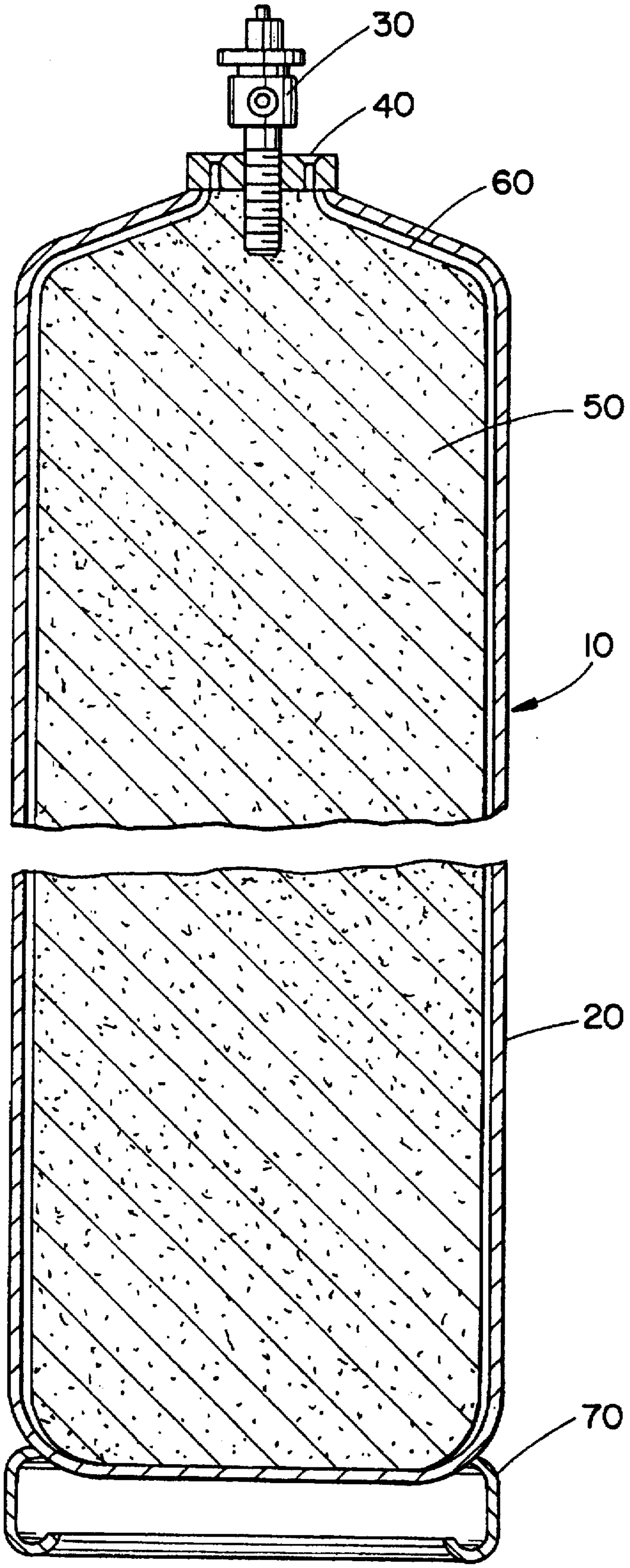
30
40
60
50
10
20
70

HIGH POROSITY CALCIUM SILICATE MASS FOR STORING ACETYLENE GAS

This application is a continuation-in-part of U.S. patent application Ser. No. 08/381,356 filed on Jan. 31, 1995 and now U.S. Pat. No. 5,632,788.

BACKGROUND OF THE INVENTION

This invention relates to a porous calcium silicate filler material. More particularly, the invention relates to acetylene gas storage vessels having an asbestos-free calcium silicate filler material therein and a method for manufacturing same.

Acetylene is widely used in oxy-acetylene torches because it enables temperatures of up to 3500° C. to be reached for the welding and cutting of metals. However, acetylene gas is difficult to store because it is unstable and can decompose to its elements, carbon and hydrogen, with explosive violence at pressures greater than about 1 atmosphere if not properly stabilized. To provide for safe storage of acetylene gas, the gas must be dissolved in a solvent. Acetylene gas is thus typically stored in the form of an acetylene gas solution dissolved in, for example, an acetone solvent, in a vessel containing a porous filler mass. The storage vessel may be a steel cylinder. In this way, acetylene can be safely stored and shipped under pressures of up to about 17 atmospheres.

The porous filler mass comprises a capillary system of interconnecting micropores. Typically the porous filler mass is a hardened calcium silicate mass having a porosity of about 90%. The calcium silicate mass allows sufficient surface area to aid in maximum contact between the solvent and the acetylene. This system will absorb acetylene at a rate approaching 0.58 lbs. of acetylene per pound of the solvent.

The acetylene-containing cylinders are produced by filling the cylinder with the porous filler mass and injecting the solvent into the cylinder. Acetylene is then introduced into the cylinder and is distributed throughout the capillary system of the porous material as a result of its dissolution in the solvent. In this way, it is possible to insure safe storage of dissolved acetylene in quantities of up to eight times the volume of the gas which could be stored without the porous mass/solvent system.

The calcium silicate storage mass is made by mixing quicklime (calcium oxide) into water to form an aqueous slurry. Ground quartz silica is added to the slurry. A reinforcing agent is added during the mixing step to help create and hold a homogenous solution to insure a uniform mass throughout the cylinder after curing and drying. Traditionally, asbestos fibers have been used for this purpose. During mixing, one or more agents can be added to insure that the mass remains monolithic before the crystalline structure is formed during curing.

The solids are mixed in an aqueous solution for certain mixing times. The slurry is then pumped into cylinder shells completely filling them and is then cured, creating a crystalline calcium silicate mass in the cylinder. The mass is then dried to form a high porosity core, which allows the absorption of the solvent and the acetylene gas.

It is of great importance that the calcium silicate filler mass should be monolithic and should be substantially free of voids. Void spaces in the filler mass provide an available space for the formation of unacceptable volumes of acetylene gas with the attendant explosion risk. Thus, the filler mass must be formed with uniformly distributed very fine pores. During drying, the mass shrinkage must be kept controlled to less than 0.5% in any dimension but never to exceed 0.125 inches (0.060 inches for cylinders with filler lengths of 18 inches or less) in a longitudinal direction inside the steel shell.

Previously, asbestos fibers were introduced into the aqueous slurry from which the calcium silicate filler mass was produced. The asbestos fibers functioned as a settling resistant or suspending agent to retard the settling or separation of the lime and silica from the water in the aqueous slurry composition prior to its hardening into the calcium silicate filler mass. In addition, in the hardened calcium silicate filler mass, the asbestos fibers acted as a reinforcing agent to help maintain the structural integrity of the filler mass.

However, asbestos fibers have now been found to pose potential health and pollution problems. Constraints relating to health and safety conditions and to the handling of asbestos material have led to the consideration of other suspending and reinforcing agents in the calcium silicate filler mass.

One known substitute for asbestos fibers in the calcium silicate filler mass is an alkali resistant glass fiber. An acetylene storage vessel having a hardened asbestos-free calcium silicate filler mass reinforced by glass fibers is disclosed in U.S. Pat. No. 4,349,463. While glass fibers are acceptable for this purpose, the cost of such alkali resistant glass fibers is rather high.

Therefore, others have tried to use organic suspending and reinforcing agents such as cellulose, together with mineral suspending agents. One known such calcium silicate filler mass is disclosed in U.S. Pat. No. 4,895,825. This mass includes cellulose reinforcing fibers, as well as a mineral suspending agent which can be either solid glass fibers or solids of purified clay. However, the cost for this filler material is still rather high. In addition, the blending sequence of this material is complicated since it involves the steps of slaking quicklime with hot water to form a first mixture; adding additional water and stirring at a slow speed to form a second mixture; dispersing a cellulose reinforcing agent in the second mixture to form a third mixture; introducing with stirring into the third mixture a mixture of natural silica and either calcium silicate or amorphous ultra-fine synthetic silica to form a fourth mixture and subsequently dispersing a second mineral suspending agent, which can be either glass fibers or purified clay, into the fifth mixture to form a sixth mixture. Only then is the sixth mixture transferred into the storage cylinder to be filled. Also, the step of slaking quicklime with hot water is hazardous as a volatile mixture is created.

Accordingly, it has been considered desirable to develop a new and improved calcium silicate storage mass and a method for manufacturing same, which would overcome the foregoing difficulties and others while providing better and more advantageous overall results.

BRIEF SUMMARY OF THE INVENTION

In accordance with the present invention, a new and improved process for filling a cylinder with a calcium silicate porous mass to produce an acetylene gas storage cylinder is provided.

More particularly, the process comprises the steps of mixing about 8–15% by wet weight, quicklime with ambient temperature water to form a first mixture. The subsequent exothermic reaction is allowed to go to completion (about 1–3 hours). Then 8–15% by wet weight, quartz silica is blended into the first mixture to form a second mixture which is allowed to sit for a minimum of 1 to 24 hours. After the second mixture is allowed to sit, 0.5 to 3% by wet weight, of a fibrous reinforcing material is blended into the second mixture to form a third mixture. Finally, 1.0 to 3.5% by wet weight, precipitated silica is added to the third mixture to form a fourth mixture. The fourth mixture can also be made by adding 0.2% to 1.5% by wet weight, synthetic silica to the third mixture. The fourth mixture is then transferred into a cylinder to be filled. The fourth mixture is cured under saturated steam pressure of about 145 psig for about 20–36 hours. The cylinder is then dried for about four to five days at a temperature of about 375° F. to 615° F.

If desired the first mixing step can occur at approximately 75–1250 rpm, as can the second mixing step. The blending and homogenizing steps can, if desired, be performed by stirring at approximately 75–1250 rpm. If desired, the homogenizing step can be performed under a partial vacuum between about 10 inches and 18 inches of Hg. Also, the step of transferring can comprise, if desired, the subsidiary step of pumping the slurry at a vacuum of about 10 inches of Hg. Preferably, the fibrous reinforcing material is cellulose.

According to another aspect of the present invention, a gas storage cylinder is provided for storing gases therein.

More particularly in accordance with this aspect of the invention, the storage cylinder comprises a metal shell and a monolithic dry mass filling the shell. The mass has a porosity of about 88 to 92% and a density range of about 250 g/l to 350 g/l. The mass constitutes a dry product of an aqueous paste consisting essentially of a fibrous reinforcing material at about 0.5% to 3.0% total wet weight, water, precipitated silica at about 1.0% to 3.5% total wet weight (or synthetic silica at about 0.2% to 1.5% total wet weight), quicklime at about 8% to 15% total wet weight, and ground quartz silica at about 8% to 15% total wet weight. The water can be present in an amount of about three times greater than the amount of solids.

If desired, the cylinder can further comprise acetylene gas solution disposed in the mass. Also, a solvent can be disposed in the mass. Preferably, the solvent comprises acetone. If desired, the mass can have a crush strength between 300 and 580 psig. Preferably, the mass has a porosity between 88% and 89.2%. If desired, the mass has a density between 274 g/l and 312 g/l. If desired, the fibrous reinforcing material comprises cellulose. Alternatively, the fibrous reinforcing material can comprise aluminum silicate.

One advantage of the present invention is the provision of a new and improved method for manufacturing a high porosity filler mass for storing acetylene gas in a compressed gas cylinder.

Another advantage of the present invention is the provision of a high porosity calcium silicate filler mass having only cellulose fibers which function as both the reinforcing agent and the suspending agent thereby reducing the cost of the filler mass.

Still another advantage of the present invention is the provision of a method for mixing a slurry to form a calcium silicate filler mass in which quicklime is slaked with ambient temperature water rather than hot water to reduce the mixing time of the mass and to increase operator safety.

Yet another advantage of the present invention is the provision of a method for manufacturing a high porosity calcium silicate filler mass in which only a limited range of mixing speeds could be used for the mixing, blending and homogenizing steps. This reduces the equipment needed and the number of steps needed to mix the slurry to form the filler mass. Lower or higher mixing speeds can be used for the various mixtures if so desired.

A further advantage of the present invention is the provision of a method for manufacturing a high porosity calcium silicate filler mass in which only a single reinforcing agent is used and a limited number of ingredients are used thereby reducing the mixing steps needed to form the filler mass, as well as the cost thereof.

An additional advantage of the present invention is the provision of a method for forming a calcium silicate mass in which the slaking reaction is allowed to reach completion (so that there is no further temperature rise). This can take about 1–3 hours. Then quartz silica is added to the slaked lime and is allowed sufficient time to finish the chemical reaction. The reaction can take about 1 to 24 hours. This procedure has been found to eliminate the variability in final clearance values—between the filler mass and the adjacent cylinder wall—that might occur when adequate reaction times are not provided.

A yet further advantage of the present invention is the provision of a method of manufacturing a high porosity calcium silicate filler mass in which precipitated silica is used in addition to quartz silica to ensure that the lime and silica reaction goes to completion. This procedure has two benefits. First, it minimizes water separation which can lead to rejections of the storage cylinders due to excessive clearance between the filler mass and the cylinder wall. Second, the use of precipitated silica is less expensive than the use of synthetic silica while providing the same results.

Still further advantages of the present invention will become apparent to those of ordinary skill in the art upon the reading and understanding of the following detailed description of the preferred embodiments.

BRIEF DESCRIPTION OF THE DRAWING

The single FIGURE of the drawing is a simplified schematic cross-sectional view of an acetylene storage vessel having an asbestos-free hardened porous calcium silicate filler mass reinforced with only cellulose fibers in accordance with the present invention.

DESCRIPTION OF THE PREFERRED EMBODIMENTS

In order to afford a complete understanding of the present invention and an appreciation of its advantages, a description of the preferred embodiments of the present invention is presented herein.

With reference to the single FIGURE of the drawing, an acetylene storage vessel 10 comprises a metal shell 20 typically having a cylindrical shape forming an enclosed volume. The acetylene storage vessel is also typically provided with a valve 30 and fuse plugs 40. A hardened monolithic porous calcium silicate filler mass 50 is disposed in and substantially fills the enclosed volume of the shell 20 for receiving a dissolved acetylene gas solution.

It is known in the art that a small clearance space 60 is desirable, although not required, between the upper end of the cylinder shell and the filler mass 30. Such clearance space assists in charging the cylinder with a dissolved acetylene gas solution and in the release of acetylene gas from the solution disposed in the porous calcium silicate filler mass 50. However, this clearance space can be no greater than 0.5% of any cylinder shell dimension and not greater than 0.125 inches in a longitudinal direction inside the cylinder 20. However, for cylinders with filler lengths of 18 inches or less, the allowable clearance is only 0.060 inches. Excessive clearance must be avoided due to safety considerations. An excessively large clearance space would provide unsafe storage of the acetylene because free acetylene gas could form in these locations and potentially explode. The space 60 is shown as being larger only for the sake of comprehension.

The vessel 10 is also provided with a foot ring 70 in order to stabilize the shell 20 in an upright position.

The method according to the present invention involves adding quicklime to water at ambient temperature to form a first mixture which is allowed to slake completely. Then quartz silica is added to the slaked lime and allowed to react sufficiently. Cellulose is then blended in to form a third mixture. After the third mixture has been blended for a predetermined short time, precipitated silica is added forming a fourth mixture, which is further homogenized.

In accordance with the present invention, cellulose fibers have been found, after mixing at certain levels, to form a sufficient reinforcement in a calcium silicate mass to allow proper size and distribution of the pores to achieve a porosity of up to 92% and a strength of up to 575 psig in the resulting mass. A fibrous reinforcing material has been shown to be the most effective at a level of about 0.5% to 3.0% total wet weight. The fibrous reinforcing material can be cellulose, aluminum silicate, carbon fiber, glass fiber or magnesium silicate. As is known, the cellulose is at least partially delignified, either chemically or mechanically, or both.

The ground quartz silica used has an average particle size diameter of 11.9 microns. The precipitated silica has a surface area between 135 and 165 $m^2/g$. The synthetic silica has an average surface area of 200 $m^2/g$.

The quicklime addition is in amounts proportional to the amount of silica. They should be added in a one to one molar ratio. Therefore, the amount of quicklime will vary between about 8% to about 15% total wet weight with ground quartz silica ranging from about 8% to 15% total wet weight. Precipitated silica is used in smaller amounts of about 1.0% to 3.5% to total weight (or synthetic silica in much smaller amounts of about 0.2% to 1.5%). A fibrous reinforcing material, such as cellulose, is added in amounts of 0.5% to 3.0% total wet weight. The balance of the formula is water, which is present in the mixture in an amount of about three times greater than the amount of solids. A preferred amount of water is about 3.2 to 3.4 times the amount of solids. After drying, examination shows that the mass completely fills the cylinder. Shrinkage is less than 0.5%. Most typically, the actual shrinkage approaches only 0.060 inches in a longitudinal direction and less than 0.025 inches latitudinally in the cylinder. The density of the dry mass has been found to be between 270 g/l to 310 g/l. A crush strength between 250 psig and 575 psig is also typical. It is estimated that a minimum of 35% by weight and most typically greater than 50% of the hardened porous calcium silicate filler mass is in a crystalline phase to minimize shrinkage.

With a porosity between 88% and 92%, the mass is very capable of holding acetylene gas safely in a solution of a solvent, preferably acetone as mentioned, within the mass.

The invention will now be illustrated by the following non-limiting examples:

EXAMPLE I

A total of 198 lb. quicklime (¾ rock, 94% CaO from Dravo in Birmingham, Ala.) was mixed with 130 gallons of ambient temperature water at about 1000 rpm until completely slaked (about 1 to 3 hours, until the temperature of the solution no longer increases). After slaking, 200 lb. of quartz silica (Grade #53 Silcosil from U.S. Silica Co. of Pittsburgh, Pa.) was added, mixed at about 1000 rpm and allowed to react for two days (about 48 hours). Forty pounds of cellulose fibers (Brunswick softwood filter pulp from Georgia Pacific of Atlanta, Ga.), which had been pre-soaked in 20 gallons of water, was then added along with 3 gallons of water and blended for 3 minutes at about 1250 rpm. Six lb. of synthetic silica (HDK-N20 from Wacker Silicones of Adrian, Mich.) was added and homogenized at about 1250 rpm. Then another six lb. of synthetic silica was added and homogenized at about 1250 rpm. Each addition was homogenized for eleven minutes under a vacuum of 15 inches of mercury. However, all of the silica could have been added at one time.

The mixing speed was indicated in Example I to be about 1000 to 1250 rpm. However, depending on the batch size, lower mixing speeds can be used as well in order to avert the need to use very large motors for the mixing process in large mixing vessels. Therefore, when a large size mixing vessel is used, the mixing speed can be on the order of about 100 rpm instead of about 1000 rpm. It has been found that the process according to the present invention is essentially independent of the speed employed during the mixing, homogenizing, blending or dispersing steps.

The monolithic slurry was pumped into a cylinder shell under a vacuum of 10 inches of mercury. The resulting mass in the cylinder was cured for approximately 36 hours at 145 psig saturated steam. It was then dried for 5 days at a temperature of about 375° to 400° F.

The physical properties of the resulting porous calcium silicate filler mass showed a porosity of 89.2%, a shrinkage of less than 0.010 inches both longitudinally and latitudinally, a density of between 289 g/l and 312 g/l, and a crush strength of between 508 and 562 psig.

EXAMPLE II

A total of 198 lb. quicklime was mixed with 130 gallons of ambient temperature water at about 1000 rpm until completely slaked. After slaking, 165 lb. of quartz silica was added and mixed at about 1000 rpm and allowed to react overnight (about 12 to 18 hours). Forty-five pounds of cellulose fibers which had been pre-soaked in 20 gallons of water was then added together with 13 gallons of water and blended for 3 minutes at about 1250 rpm. Then, thirty-five pounds of precipitated silica (HI-SIL ABS from PPG, Lake Charles, La.) was added and homogenized at about 1250 rpm for fourteen minutes under a vacuum of 15 inches of mercury.

The monolithic slurry was pumped into a cylinder shell under a vacuum of 10 inches of mercury. The resulting mass in the cylinder was cured for approximately 24 hours at 145 psig saturated steam. Another batch of the same mass was cured for 30 hours at the same pressure. Both batches were then dried for 5 days at a temperature of about 375° F. to 400° F.

The physical properties of the resulting porous calcium silicate filler mass indicated a porosity of 88.0%, a shrinkage of less than 0.020 inches both longitudinally and latitudinally and a density of between 274 and 292 g/l for both batches. A crush test of 379 psig was achieved for the 24 hour cure batch and a crush test of 577 psig was achieved for the 30 hour cure batch.

EXAMPLE III

A total of 198 lb. quicklime was mixed with 130 gallons of ambient temperature water at about 75–100 rpm until completely slaked. After slaking, 165 lb. of quartz silica was added, mixed at 75–100 rpm and allowed to react overnight. Forty-two pounds of cellulose fibers, which had been presoaked in 20 gallons of water, was then added along with 15 gallons of water and blended for 3 minutes at about 1250 rpm. Then, thirty-five pounds of precipitated silica was added and homogenized at 1250 rpm for fourteen minutes under a vacuum of 15 inches of mercury.

The monolithic slurry was pumped into a cylinder shell under a vacuum of 10 inches of mercury. The resulting mass in the cylinder was cured for approximately 24 hours at 145 psig saturated steam. Another batch of the material was cured for 26 hours at the same pressure. Both batches were then dried for 5 days at a temperature of about 375° F. to 400° F.

The physical properties of the resulting porous calcium silicate filler mass cured for 24 hours indicated a porosity of 89.2%, a shrinkage of less than 0.060 inches both longitudinally and latitudinally and a density of about 296 g/l. A crush test of 368 psig was achieved for the 24 hour cure. A crush test of 427 psig was achieved for the 26 hour cure.

EXAMPLE IV

A total of 198 lbs. quicklime was mixed with 130 gallons of ambient temperature water at about 1000 rpm until completely slaked. After slaking, 165 lbs. of quartz silica was added and mixed at about 1000 rpm and allowed to react overnight (about 12 to 18 hours). Forty lbs. of aluminum silicate fibers (sold under the trademark Kaowool by Thermal Ceramics of Baton Rouge, La.) was added together with 23 gallons of water and blended for three minutes at about 1250 rpm. Then, 12 lbs. of synthetic silica was added and homogenized at about 1250 rpm for 14 minutes under a vacuum of 15 inches of mercury.

The monolithic slurry was pumped into a cylinder shell under a vacuum of 10 inches of mercury. The resulting mass in the cylinder was cured for approximately 36 hours at 145 psig saturated steam. The batch was then dried for about 4 days at a temperature of about 615° F.

The physical properties of the resulting porous calcium silicate filler mass indicated a porosity of 87.9%, a shrinkage of less than 0.010 inches, both longitudinally and latitudinally and a density of about 353 g/l. A crush strength of between 471 and 574 psig was achieved.

The cylinders so manufactured have successfully passed the Compressed Gas Cylinders Association bonfire test, flashback test and two mechanical strength tests, namely, a mechanical strength of filler test and an impact stability test. The tests are described in detail in pamphlet No. C-12 of the Compressed Gas Cylinders Association. These tests have been incorporated into the Department of Transportation's regulations listed in 49 C.F.R. and entitled "Qualifications Procedure for Acetylene Cylinder Design."

Briefly, the proof of the mechanical strength of the filler test involved subjecting the cylinders filled with the porous calcium silicate mass according to the present invention to 5000 drops at 3 inches. In all cases, the filler did not exceed a 0.0625 inch vertical drop. This passes the test.

The flashback test involved subjecting full cylinders having the porous calcium silicate filler mass according to the present invention to an internal flash. In all cases, the porous calcium silicate mass absorbed the energy without failure to the cylinder.

The fire test involved subjecting full cylinders employing a calcium silicate filler mass according to the present invention to a chimney fire. In all cases, the cylinder did not rupture and acetylene was vented by the fuse plugs.

Finally, the impact stability test involved denting full cylinders employing a calcium silicate filler mass according to the present invention to over ¼ of the diameter of the cylinder. This resulted in no failure to either the shell or the mass.

In addition to passing the foregoing described tests, an acetylene storage vessel having a calcium silicate filler mass reinforced with only cellulose fibers according to the present invention exhibits satisfactory acetylene gas discharge characteristics.

The invention has been described with reference to preferred embodiments. Obviously, modifications and alterations will occur to others upon a reading and understanding of the preceding detailed description. It is intended that the invention be construed as including all such modifications and alterations insofar as they come within the scope of the appended claims or the equivalents thereof.

What is claimed is:

1. A process for filling a cylinder with a porous calcium silicate mass to produce an acetylene gas storage cylinder, said process comprising the steps of:

- mixing about 8% to 15% by wet weight quicklime with ambient temperature water to form a first mixture which is allowed to completely slake;
- mixing 8% to 15% by wet weight quartz silica into the first mixture to form a second mixture which is allowed to react for a minimum of 1 to 24 hours;
- blending 0.5% to 3.0% by wet weight of a fibrous reinforcing material into the second mixture to form a third mixture;
- homogenizing a material from the group consisting of 1.0% to 3.5% by wet weight precipitated silica and 0.2% to 1.5% by wet weight synthetic silica into the third mixture to form a fourth mixture;
- transferring said fourth mixture into a cylinder to be filled;
- curing said fourth mixture under saturation steam pressure of about 145 psig for about 20 to 36 hours; and,
- drying said cylinder for about four to five days at a temperature of about 375° to 615° F. to fill said cylinder with a porous calcium silicate mass consisting essentially of:
  - a fibrous reinforcing material at about 0.5% to 3.0% total wet weight,
  - water,
  - quicklime at about 8% to 15% total wet weight,
  - ground quartz silica at about 8% to 15% total wet weight, and
  - a material selected from the group consisting of precipitated silica at about 1.0% to 3.5% total wet weight and synthetic silica at about 0.2% to 1.5% total wet weight, the water being present in an amount of about three times greater than the amount of solids.

2. The method of claim 1 wherein said quicklime mixing step occurs at a speed of approximately 75 to 1250 rpm.

3. The method of claim 1 wherein said quartz silica mixing step occurs at a speed of approximately 75 to 1250 rpm.

4. The method of claim 1 wherein said blending step occurs at a speed of approximately 75 to 1250 rpm.

5. The method of claim 1 wherein said homogenizing step occurs at a speed of approximately 75 to 1250 rpm.

6. The method of claim 1 wherein said homogenizing step is performed under a partial vacuum at between about 10 inches Hg and 18 inches Hg.

7. The method of claim 1 wherein said step of transferring is performed under a partial vacuum of about 10 inches Hg.

8. The method of claim 1 wherein the fibrous material comprises cellulose.

9. A gas storage cylinder for storing gases therein, comprising:

a metal shell; and, a monolithic dry mass filling said shell, said mass having a porosity of about 88% to 92% and a density range of about 250 g/l to 350 g/l and constituting a dried product of an aqueous paste consisting essentially of:

a fibrous reinforcing material at about 0.5% to 3.0% total wet weight, water, quicklime at about 8% to 15% total wet weight, ground quartz silica at about 8% to 15% total wet weight, ground quartz silica at about 8% to 15% total wet weight, and a material selected from the group consisting of precipitated silica at about 1.0% to 3.5% total wet weight and synthetic silica at about 0.2% to 1.5% total wet weight, the water being present in an amount of about three times greater than the amount of solids.

10. The cylinder of claim 9 further comprising a dissolved acetylene gas solution disposed in said mass.

11. The cylinder of claim 10 further comprising a solvent disposed in said mass.

12. The cylinder of claim 11 wherein said solvent comprises acetone.

13. The cylinder of claim 9 wherein said mass has a crush strength between 300 and 580 psig.

14. The cylinder of claim 9 wherein said mass has a porosity between 88% and 89.2%.

15. The cylinder of claim 9 wherein said mass has a density between 274 and 312 g/l.

16. The cylinder of claim 9 wherein said fibrous reinforcing material comprises cellulose.

17. The cylinder of claim 9 wherein said fibrous reinforcing material comprises aluminum silicate.

18. A filler mass for storing a gas therein, comprising:

a fibrous reinforcing material at about 0.5% to 3.0% total wet weight, said material selected from the group consisting of cellulose, aluminum silicate, carbon fiber, and magnesium silicate, water, quicklime at about 8% to 15% total wet weight, ground quartz silica at about 8% to 15% total wet weight, and a material selected from the group consisting of precipitated silica at about 1.0% to 3.5% total wet weight and synthetic silica at about 0.2% to 1.5% total wet weight, the water being present in an amount of about three times greater than the amount of solids, said filler mass characterized by an absence of glass fibers or clay as a mineral suspending agent.

19. The filler mass of claim 18 wherein said mass has a porosity of about 88% to 92%.

20. The filler mass of claim 18 wherein said mass has a density range of about 250 g/l to 350 g/l.

21. A process for producing a gas storage cylinder, said process comprising the steps of:

providing a cylinder to be filled; and, filling said cylinder with a porous calcium silicate mass comprising:

a fibrous reinforcing material at about 0.5% to 3.0% total wet weight, said material selected from the group consisting of cellulose, aluminum silicate, carbon fiber, and magnesium silicate, water, quicklime at about 8% to 15% total wet weight, ground quartz silica at about 8% to 15% total wet weight, and a material selected from the group consisting of precipitated silica at about 1.0% to 3.5% total wet weight and synthetic silica at about 0.2% to 1.5% total wet weight, the water being present in an amount of about three times greater than the amount of solids, said filler mass characterized by an absence of glass fibers or clay as a mineral suspending agent.

* * * * *